US008402430B2

(12) United States Patent
Wilson et al.

(10) Patent No.: US 8,402,430 B2
(45) Date of Patent: *Mar. 19, 2013

(54) SYSTEM AND METHOD FOR INTEGRATING OBJECT-ORIENTED MODEL PROFILES AND OBJECT-ORIENTED PROGRAMMING LANGUAGES

(75) Inventors: Kirk D. Wilson, Sugar Hill, NH (US); Christopher X. Condit, San Francisco, CA (US); It-Beng Tan, Redwood City, CA (US)

(73) Assignee: CA, Inc., Islandia, NY (US)

( * ) Notice: Subject to any disclaimer, the term of this patent is extended or adjusted under 35 U.S.C. 154(b) by 198 days.

This patent is subject to a terminal disclaimer.

(21) Appl. No.: 12/886,125

(22) Filed: Sep. 20, 2010

(65) Prior Publication Data

US 2011/0010686 A1 Jan. 13, 2011

Related U.S. Application Data

(63) Continuation of application No. 10/421,612, filed on Apr. 22, 2003, now Pat. No. 7,827,524.

(51) Int. Cl.
*G06F 9/44* (2006.01)

(52) U.S. Cl. ........ 717/108; 717/104; 717/105; 717/116; 717/143

(58) Field of Classification Search .................. None
See application file for complete search history.

(56) References Cited

U.S. PATENT DOCUMENTS

| | | | |
|---|---|---|---|
| 5,499,371 A | 3/1996 | Henninger et al. ........... 717/108 |
| 5,768,480 A | 6/1998 | Crawford, Jr. et al. ......... 395/62 |
| 5,907,706 A | 5/1999 | Brodsky et al. .............. 717/105 |
| 5,978,581 A | 11/1999 | Sadiq et al. ................... 717/104 |
| 5,983,016 A | 11/1999 | Brodsky et al. .............. 717/104 |
| 6,134,559 A | 10/2000 | Brumme et al. ...................... 1/1 |
| 6,199,195 B1* | 3/2001 | Goodwin et al. .............. 717/104 |
| 6,502,239 B2* | 12/2002 | Zgarba et al. ................. 717/168 |
| 6,604,068 B1 | 8/2003 | Bukowski et al. .............. 703/22 |
| 6,643,633 B2 | 11/2003 | Chau et al. ........................... 1/1 |
| 2004/0111702 A1* | 6/2004 | Chan .............................. 717/113 |
| 2005/0246681 A1* | 11/2005 | Little et al. .................... 717/106 |

OTHER PUBLICATIONS

Notification of Transmittal of the International Search Report—Form PCT/ISA/220 (3 pages); PCT International Search Report—Form PCT/ISA/210 (5 pages); PCT/US2004/012055, mailed Nov. 26, 2004.
Koch, Thomas, et al., "Model Driven Architecture", XP-002303339, Nov. 28, 2001, <www.orng.org/cgi-bin/doc?ormsc/2002-09-04>, visited Oct. 28, 2004, 31 pages.
Keller, Rudolf K., et al., "Pattern-Based Reverse-Engineering of Design Components", *Proceedings of the 21st International Conference on Software Engineering*, 1999, XP-002303340. pp. 226-235.

(Continued)

*Primary Examiner* — Isaac Tecklu
(74) *Attorney, Agent, or Firm* — Pillsbury Winthrop Shaw Pittman LLP

(57) ABSTRACT

A method includes receiving a modeling template, the modeling template comprising a plurality of modeling constructs and profile constructs, each profile construct generated from a modeling profile and comprising an extension of one of the modeling constructs. The method further includes parsing the modeling template into the plurality of modeling constructs and profile constructs. One or more object-oriented constructs are defined based, at least in part, on the parsed modeling constructs and profile constructs. Source code is automatically generated in an object-oriented programming language based, at least in part, on the defined object-oriented constructs. The object-oriented programming language comprises an object-oriented programming language with embedded inferencing.

20 Claims, 11 Drawing Sheets

OTHER PUBLICATIONS

Voelter, Markus, "A Catalog of Patterns for Program Generation", XP-002303341, Apr. 14, 2003; <www.voelter.de/data/pub/programgeneration.pdf>, visited Oct. 29, 2004, 33 pages.

Bruns, Glenn R., et al., "Automated Software Development with XML and the Java* Language", XP-000959125, *Bell Labs Technical Journal*, vol. 5, No. 2, Apr. 6, 2000, pp. 32-43.

International Business Machines Corporation, "Universal Code Generator Based on Templates and Design Models", Research Disclosure, Kenneth Mason Publications, XP-007124925, vol. 426, No. 68, Oct. 1999, 1 page.

Miller, J., et al., "Model Driven Architecture (MDA)", Object Management Group Draft Document, XP-002263572, Jul. 9, 2001, pp. 1-31.

Miranker, Daniel P., et al., "Venus: An Object-Oriented Extension of Rule-Based Programming", Department of Computer Sciences and Applied Research Laboratories, The University of Texas at Austin, Oct. 19, 1998, 21 pages.

OMG Unified Modeling Language Specification, Version 1.4, Sep. 2001, Object Management Group, Inc. specification, 566 pages.

Wilson, Kirk D., "Implementing Business Rules with Inferencing (Part 1): The importance of Inferencing", printed from http://www.brcommunity.com/p-a422a.php, copyright 1997-2003 Business Rule Solution, LLC, Jul. 1999, 4 pages.

Wilson, Kirk D., "ImPlementing Business Rules with Inferencing (Part 2): Implementing Inferencing in Business Rule Engines", printed from http://www.brcommunity.com/p-a422b.php, copyright 1997-2003 Business Rule Solutions, LLC, 3 pages.

"R++ User Manual", Issue 2.0, AT&T Bell Laboratories, Middletown, New Jersey, Mar. 2, 1995, 104 pages.

* cited by examiner

FIG. 3A

| STEREOTYPED PROFILE CONSTRUCTS | PARENT MODELING CONSTRUCT | ASSOCIATED TAGGED PROFILE CONSTRUCT | MAPPING ALGORITHM |
|---|---|---|---|
| _Association | ASSOCIATION CLASS | SOURCE DESTINATION | ASSOCIATE WITH PARENT CLASS FOR ASSOCIATION CLASSES IN THE TARGET PROGRAMMING LANGUAGE. CREATE THE CLASS, PROCESS SOURCE AND DESTINATION TAGGED VALUES |
| _System | CLASS | | ASSOCIATE WITH PARENT CLASS FOR ABSTRACT CLASSES (UNINSTANTIABLE CLASSES) IN THE TARGET PROGRAMMING LANGUAGE |
| CLASS CONTAINMENT | ASSOCIATION END | | CREATE AN ATTRIBUTE ON THE CLASS AT THE OPPOSITE END OF THE ASSOCIATION OF THE SAME TYPE AS THE CLASS TO WHICH THE STEREOTYPED ASSOCIATION END BELONGS |
| ConstrainedInteger | DATA TYPE | DataConstraint | ASSOCIATE WITH THE INTEGER CONSTRAINED DATA TYPE DURING CLASS PROCESSING IN THE TARGET PROGRAMMING LANGUAGE. POPULATE THE VALUE OF THE APPROPRIATE ATTRIBUTE OF THE ConstrainedInteger TYPE WITH THE VALUE OF TAGGED VALUE |
| ConstrainedReal | DATA TYPE | DataConstraint | ASSOCIATE WITH THE REAL CONSTRAINED DATA TYPE DURING CLASS PROCESSING IN THE TARGET PROGRAMMING LANGUAGE. POPULATE THE VALUE OF THE APPROPRIATE ATTRIBUTE OF THE ConstrainedReal TYPE WITH THE VALUE OF TAGGED VALUE |

370 — FROM FIG. 3A

| | | | |
|---|---|---|---|
| ConstrainedString | DATA TYPE | DataConstraint | ASSOCIATE WITH THE STRING CONSTRAINED DATA TYPE DURING CLASS PROCESSING IN THE TARGET PROGRAMMING LANGUAGE. POPULATE THE VALUE OF THE APPROPRIATE ATTRIBUTE OF THE ConstrainedString TYPE WITH THE VALUE OF TAGGED VALUE |
| ConstrainedBoolean | DATA TYPE | DataConstraint | ASSOCIATE WITH THE BOOLEAN CONSTRAINED DATA TYPE DURING CLASS PROCESSING IN THE TARGET PROGRAMMING LANGUAGE. POPULATE THE VALUE OF THE APPROPRIATE ATTRIBUTE OF THE ConstrainedBoolean TYPE WITH THE VALUE OF TAGGED VALUE |
| DI MEMBER* | OPERATION/ METHOD | DIMemberCondition DIMemberAction DIMemberLabel | PROCESS THE ASSOCIATED TAGGED VALUES ON THE OPERATION/METHOD SPECIFIED WITH THIS STEREOTYPE |
| INFERENCE METHOD | OPERATION/ METHOD | | DURING METHOD PROCESSING: FOR FORWARD ENGINEERING: ADD APPROPRIATE COMMENT TO METHOD IMPLEMENTATION. FOR REVERSE ENGINEERING: STEREOTYPE METHODS THAT CONTAIN CODE THE POST RULES TO AN INFERENCE ENGINE AND EXECUTE THOSE RULES |
| RULE METHOD | OPERATION/ METHOD | | DURING METHOD PROCESSING: ADD APPROPRIATE COMMENT TO METHOD IMPLEMENTATION. DURING OPERATION PROCESSING STEREOTYPE METHODS CONTAINING RULES |
| bindvar | USAGE (DEPENDENCY) | Bind_Var | CREATE USAGE DEPENDENCIES BETWEEN THE APPROPRIATE CLASSES FOR EACH BIND VARIABLE DECLARATION IN THE RULE METHODS OF A CLASS |

| TAGGED PROFILE CONSTRUCT | PARENT MODELING CONSTRUCT | SEMANTICS | MAPPING ALGORITHM |
|---|---|---|---|
| EXPORTED | CLASS | YES = PUBLIC METHODS OF THE CLASS ARE EXPOSED AS MEMBERS OF THE CONTAINING COMPONENT INTERFACE | EXPORTATION IS DESIGNATED AS A PROPERTY OF A CLASS. ESTABLISHED DURING CLASS PROCESSING |
| EntryClass | CLASS | YES = CLASS OFFERS A METHOD THAT THE OPERATING SYSTEM WILL CALL TO EXECUTE THE APPLICATION | SUPPORTING ENTRY LOGIC IS DESIGNATED AS A PROPERTY OF A CLASS. ESTABLISHED DURING CLASS PROCESSING |
| DataConstraint | CONSTRAINED<DataType> (STEREOTYPE) | TEXT SPECIFYING A CONSTRAINT ON THE ASSOCIATION ATTRIBUTE | THE DataConstraint IS AN ATTRIBUTE OF A CONSTRAINED DATA TYPE. ESTABLISHED DURING CLASS PROCESSING |
| LENGTH | ATTRIBUTE | THE SPECIFIC LENGTH OF AN ATTRIBUTE OF TYPE STRING | LENGTH IS A PROPERTY OF THE ATTRIBUTE. ESTABLISHED DURING ATTRIBUTE PROCESSING |
| IsUnknown | ATTRIBUTE | YES = THE ATTRIBUTE IS CURRENTLY IN A STATE OF BEING UNKNOWN (HAS NO VALUE) | BEING UNKNOWN IS A STATE OF THE INITIAL VALUE OF AN ATTRIBUTE; NAMELY, THERE IS NO SUCH VALUE. ESTABLISHED DURING ATTRIBUTE PROCESSING |

FROM FIG. 3C

| | | | |
|---|---|---|---|
| DIMemberCondition | DI MEMBER (STEREOTYPE) | YES = METHOD SERVES TO RETURN A VALUE THAT CAN BE USED AS SATISFYING A CONDITION OF A DYNAMIC RULE | BEING A DI MEMBER CONDITION IS A PROPERTY OF A METHOD. ESTABLISHED DURING METHOD PROCESSING |
| DIMemberAction | DI MEMBER (STEREOTYPE) | YES = METHOD PROCESSES THE RESULT OF A DYNAMIC RULE FIRING | BEING A DI MEMBER ACTION IS A PROPERTY OF A METHOD. ESTABLISHED DURING METHOD PROCESSING |
| DIMemberLabel | DI MEMBER (STEREOTYPE) | EXTERNAL, USER NAME OF A METHOD THAT SERVES AS A DIMemberCondition OR DIMemberAction | THE DI MEMBER LABEL IS A PROPERTY OF A METHOD. ESTABLISHED DURING METHOD PROCESSING |
| SOURCE | _Association (STEREOTYPE) | THE CLASS AT ONE END OF AN ASSOCIATION DESCRIBED BY AN ASSOCIATION CLASS | SPECIFIED DURING PROCESSING OF ATTRIBUTES OF THE ASSOCIATION CLASS IN THE TARGET PROGRAMMING LANGUAGE |
| DESTINATION | _Association (STEREOTYPE) | THE CLASS AT THE OPPOSITE END OF THE ASSOCIATION FROM THE SOURCE IN AN ASSOCIATION DESCRIBED BY AN ASSOCIATION CLASS | SPECIFIED DURING PROCESSING OF ATTRIBUTES OF THE ASSOCIATION CLASS IN THE TARGET PROGRAMMING LANGUAGE |
| Bind_Var | bindvar (STEREOTYPE) | NAME OF THE BOUND VARIABLE IN A BINDVAR USAGE DEPENDENCY | SPECIFIED DURING PROCESSING OF THE BINDVAR STEREOTYPE |

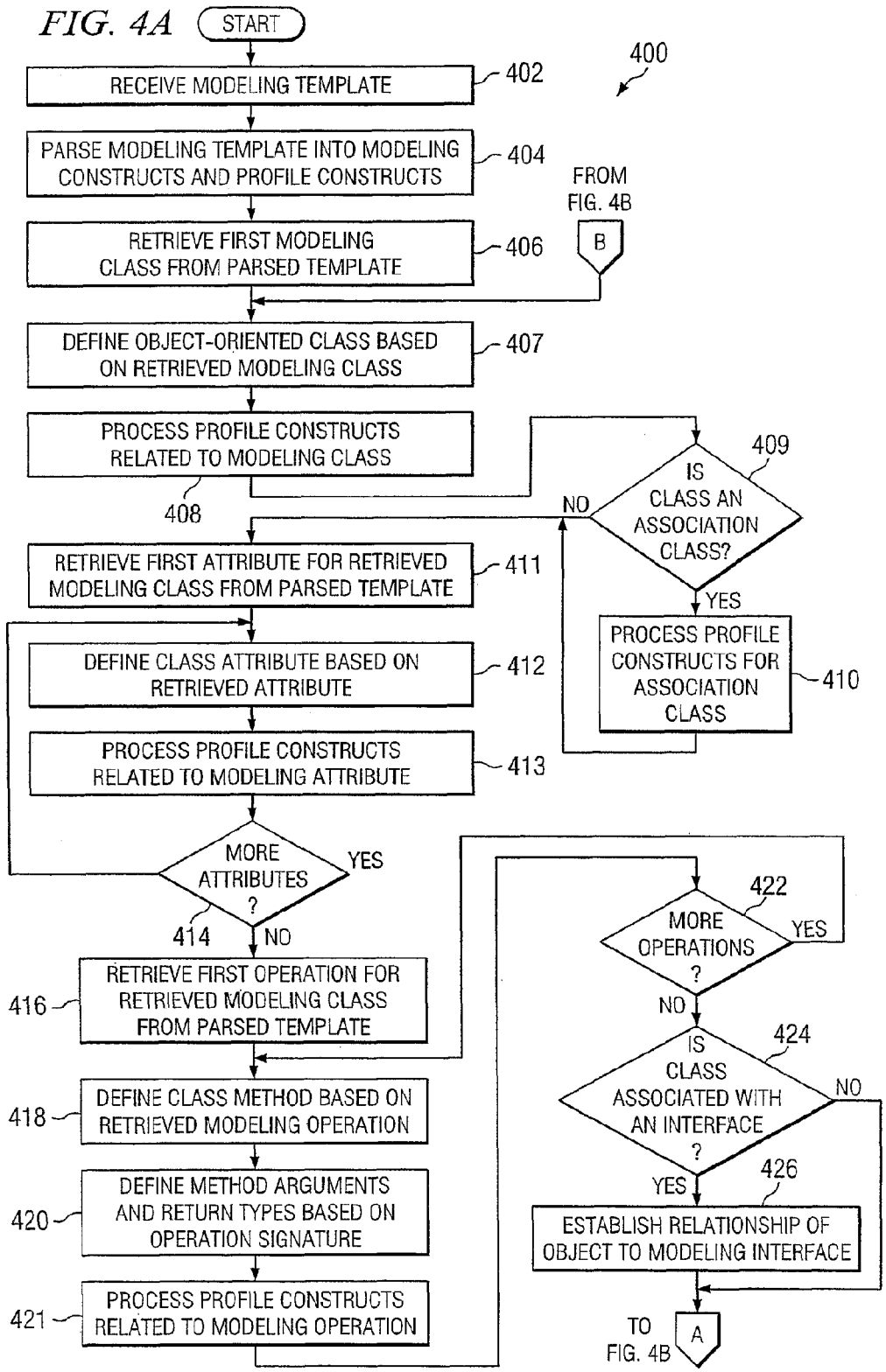

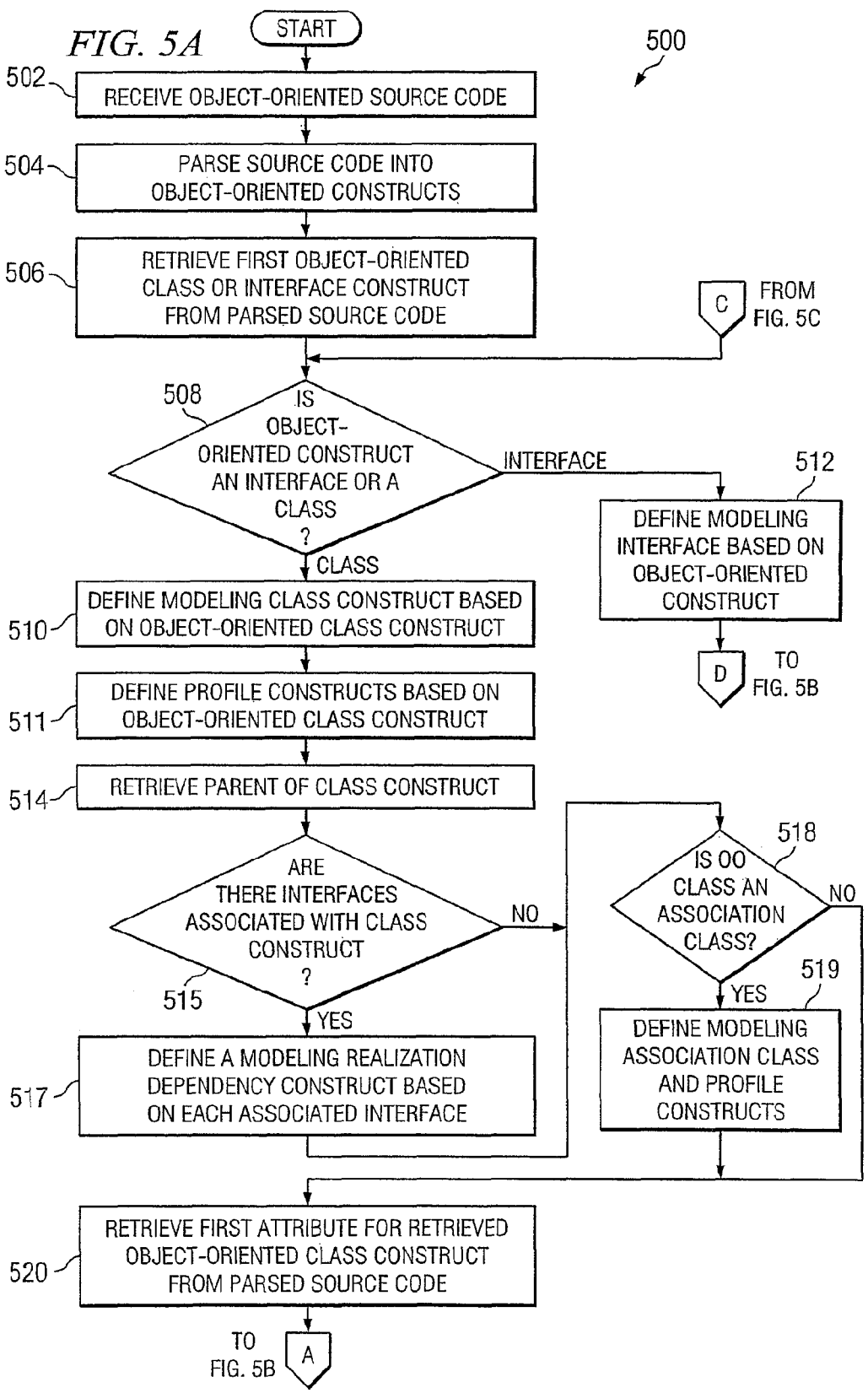

SYSTEM AND METHOD FOR INTEGRATING OBJECT-ORIENTED MODEL PROFILES AND OBJECT-ORIENTED PROGRAMMING LANGUAGES

CROSS-REFERENCE TO RELATED APPLICATIONS

This application is a continuation of U.S. patent application Ser. No. 10/421,612, entitled "System and Method for Integrating Object-Oriented Model Profiles and Object-Oriented Programming Languages," filed Apr. 22, 2003 now U.S. Pat. No. 7,827,524, the contents of which are hereby incorporated by reference in their entirety.

TECHNICAL FIELD

This disclosure relates generally to the field of computer systems, and more particularly to a system and method for integrating object-oriented model profiles and object-oriented programming languages.

BACKGROUND

Complex software systems are often developed and analyzed based on models created by a modeling language. Modeling languages allow a developer of the complex system to visualize and create various models of the components included in the complex system. Conventional modeling languages include object-oriented modeling languages such as, for example, Unified Modeling Language (UML). Traditional modeling languages are limited in scope or functionality. Therefore, some modeling languages allow for the creation of modeling profiles. These modeling profiles provide semantic extensions to the respective modeling language.

Modeling templates may be generated for exchanging models created in the modeling language and modeling profiles. These modeling templates are often created using template languages. Traditionally, modeling templates are used as a model interchange between modeling applications.

SUMMARY

This disclosure provides a system and method for integrating object-oriented model profiles and object-oriented programming languages.

In one embodiment, a method includes receiving a modeling template, the modeling template comprising a plurality of modeling constructs and profile constructs, each profile construct is generated from a modeling profile and is an extension of one modeling construct. The method further includes parsing the modeling template into the plurality of modeling constructs and profile constructs. One or more object-oriented constructs are defined based, at least in part, on the parsed modeling constructs and profile constructs. Source code is automatically generated in an object-oriented programming language based, at least in part, on the defined object-oriented constructs. The object-oriented programming language comprises an object-oriented programming language with embedded inferencing.

In another embodiment, a method includes receiving source code in an object-oriented programming language, the object-oriented programming language comprising an object-oriented programming language with embedded inferencing. The method further includes parsing the object-oriented source code into a plurality of object-oriented constructs. One or more modeling constructs are defined based, at least in part, on the parsed object-oriented constructs. One or more profile constructs are defined based, at least in part, on the parsed object-oriented constructs, each profile construct associated with a modeling construct. A modeling template is automatically generated based on the defined modeling constructs and profile constructs.

BRIEF DESCRIPTION OF THE DRAWINGS

For a more complete understanding of this disclosure, reference is now made to the following descriptions, taken in conjunction with the accompanying drawings, in which:

FIGS. 3A-D are exemplary diagrams illustrating an example mapping ruleset according to various embodiments of this disclosure;

FIGS. 4A-B are exemplary flow diagrams illustrating an example method for defining object-oriented constructs based on a modeling template according to one embodiment of this disclosure; and FIGS. 5A-C are exemplary flow diagrams illustrating an example method for defining modeling constructs and profile constructs based on object-oriented source code according to one embodiment of this disclosure.

DETAILED DESCRIPTION OF EXAMPLE EMBODIMENTS

Figure 1:
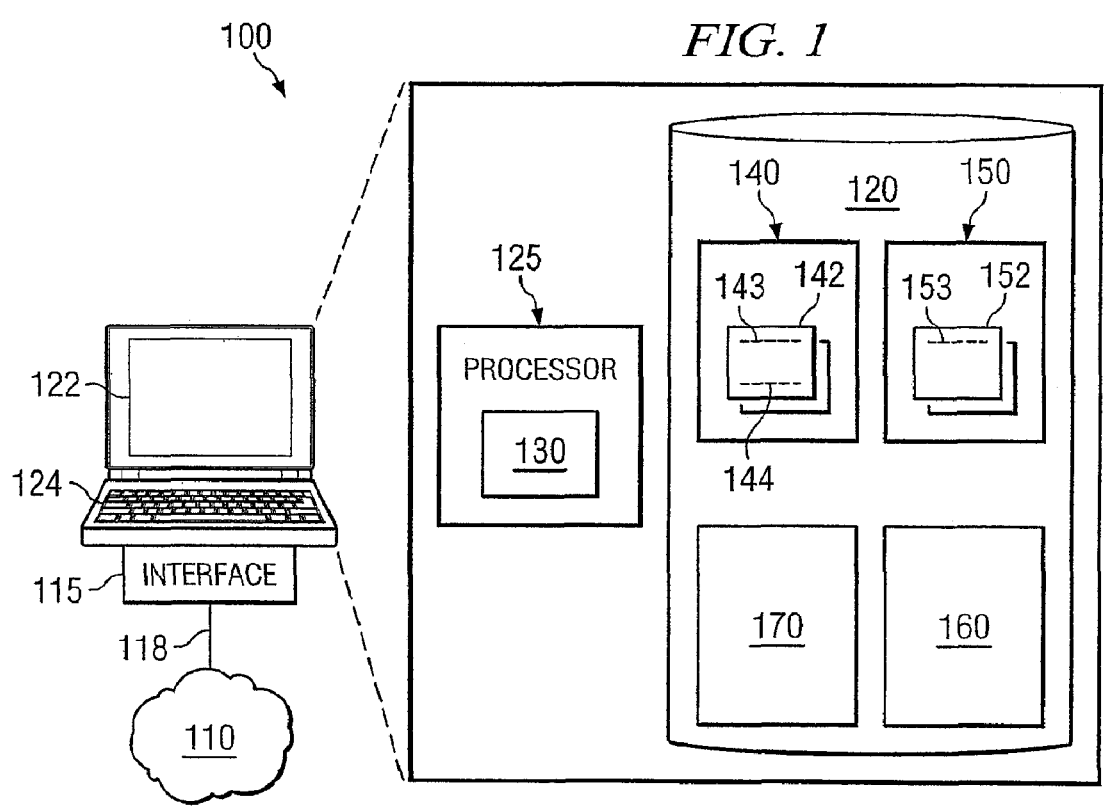
FIG. 1 is an exemplary block diagram illustrating an example system for integrating object-oriented modeling profiles and object-oriented programming languages according to one embodiment of this disclosure.

FIG. 1 illustrates a computing system 100 for integrating object-oriented modeling profiles and object-oriented programming languages through mapping constructs of each. In general, integration of object-oriented model profiles with object-oriented programming languages with embedding inferencing includes mapping, interfacing, communicating, or any other suitable processing operable to map from one type of construct to the other. Accordingly, computer 100 may comprise a portion of an information management system that maps profile constructs 144 with object-oriented constructs 153 to generate object-oriented source code modules 152 or modeling template 142. It should be understood that mapping includes at least defining object-oriented source code modules 152 based on profile constructs 144 and defining modeling template 142 based on object-oriented constructs 153.

Computer system 100 includes memory 120, processor 125, display 122, and keyboard 124. The present disclosure includes mapping engine 130, modeling templates 142, and object-oriented modules 152 that may be stored in memory 120 and may be executed or processed by processor 125. FIG. 1 only provides one example of a computer that may be used with the disclosure. The present disclosure contemplates computers other than general purpose computers as well as computers without conventional operating systems. As used in this document, the term "computer" is intended to encompass a personal computer, workstation, network computer, or any other suitable processing device. Computer system 100 may be adapted to execute any operating system including UNIX, Windows or any other operating system.

Computer 100 may also include an interface 115 for communicating with other computer systems over network 110 such as, for example, in a client-server or other distributed system via link 118. In certain embodiments, computer 100 receives modeling templates 142 and/or object-oriented modules 152 from network 110 for storage in memory 120. Network 110 facilitates wireless or wireline communication between computer system 100 and any other computer. Network 110 may communicate, for example, Internet Protocol (IP) packets, Frame Relay frames, Asynchronous Transfer Mode (ATM) cells, voice, video, data, and other suitable information between network addresses. Network 110 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 115 comprises logic encoded in software and/or hardware in a suitable combination and operable to communicate with network 110 via link 118. More specifically, interface 115 may comprise software supporting one or more communications protocols associated with link 118 and communications network 110 may comprise hardware operable to communicate physical signals.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, memory 120 includes modeling template table 140, object-oriented module table 150, modeling ruleset 160, and profile ruleset 170. Memory 120 may include any other suitable data.

Modeling template table 140 stores one or more modeling templates 142. Modeling template table 140 may receive modeling template 142 via interface 115 or from another process running on computer 100. Table 140 may be of any suitable format including XMI documents, flat files, comma-separated-value (CSV) files, relational database tables, and others. Modeling template 142 includes any file or module that describes a model 200 (described in FIG. 2) and is operable to be processed by system 100. According to certain embodiments, received modeling template 142 may be generated by any modeling application operable to process model 200 and output a generic modeling template 142. For example, modeling template 142 may be generated in eXtensible Markup Language (XML) Metadata Interchange, or XMI, based on the Unified Modeling Language, or UML. A portion of an example modeling template 142 is illustrated below. It should be understood that this example is for illustrative purposes only and that any template language in any suitable format may be used without departing from the scope of this disclosure.

within the appropriate template language and used to generate the fundamental object-oriented constructs 153 based on mapping ruleset 160. Modeling constructs 143 may include modeling class constructs with metaattributes, modeling association constructs, modeling operation constructs, modeling attribute constructs, or any other suitable modeling construct. Each modeling construct 143 may be independent, a child of another construct 143, and/or reside within another construct 143. For example, using the exemplary portion of modeling template 142 above, modeling class construct "Student" includes at least five metaattributes: "is Active," "is Root," "is Leaf," "is Abstract," and "visibility" and one modeling attribute construct "Attribute." Further, example modeling class construct "Student" is associated with a child modeling class construct "Part-Time" through a relationship of Generalization.

Modeling template 142 further comprises one or more profile constructs 144 such as, for example, stereotyped profile constructs and tagged profile constructs. Accordingly, received modeling template 142, including modeling constructs 143 and profile constructs 144, is generated by any application from a general modeling language and a related modeling profile or extension. Profile constructs 144 are template architectural elements that offer model features not normally supported by general modeling languages. Each profile construct 144 comprises an extension of modeling contract 143, thereby representing an instance of an element 219 (shown in FIG. 2) from a modeling profile. These specialized features, represented by profile constructs 144, are used to generate or modify object-oriented constructs 153 beyond the standard capabilities of modeling constructs 143. Each profile construct 144 is associated with one modeling construct 143. In short, profile construct 144 may an extension of modeling class construct, modeling association construct, modeling operation construct, modeling attribute construct, or any other suitable modeling construct.

Object-oriented module table 150 includes one or more object-oriented modules 152, each of which is source code written in an object-oriented language with embedded inferencing. Although FIG. 1 illustrates memory 120 including object-oriented module table 150, it will be understood that object-oriented module table 150 may reside locally in memory 120 or remotely on another computer or server. Object-oriented module table 150 includes any software or logic operable to be parsed into object-oriented constructs 153 such as, for example, object-oriented classes, methods, attributes, and interfaces. Each object-oriented module 152 may be written in any appropriate object-oriented computer language with embedded inferencing. It will be understood that embedded inferencing includes the ability to inference as

```
<Class name = "Student" xmi.id = "_13" isActive = "false" isRoot = "false" isLeaf = "false"
isAbstract = "false" visibility = "public" >
   < features >
   < Attribute name = "name" xmi.id = "_14" ownerScope = "instance" visibility = "protected"
      changeable = "none" targetScope = "instance" type = "String" type_Type = "DataType" />
...
< Class name = "PartTime" xmi.id = "_6" isActive = "false" isRoot = "false" isLeaf = "false"
isAbstract = "false" visibility = "public" >
   < generalizations >
   < Generalization xmi.id = "_7" parent = "Student" parent_Type = "Class" visibility = "public" />
   </ generalizations >
</ Class >
```

Modeling template 142 includes modeling constructs 143. Modeling construct 143 is an architectural element defined a feature of the semantics of the object-oriented language. Source code written in the object-oriented language with embedded inferencing would then inherently support inferencing over rules when the source code is executed on the computer system 100. In short, embedded inferencing enables object-oriented languages to support inferencing over rules without the incorporation of additional object structures such as, for example, an instantiation of an inference engine accessed through an application program interface (API).

Modeling ruleset 160 instructs mapping engine 130 in properly mapping modeling constructs 143 with object-oriented constructs 153 using any appropriate technique. Example ruleset 160 comprises instructions, algorithms, mapping tables, arrays, or any other directive or datum which largely allows for efficient and accurate integration between modeling constructs 143 and object-oriented constructs 153. Although FIG. 1 illustrates modeling ruleset 160 as residing internally to memory 120, modeling ruleset 160 may reside externally at one or more computers or internally to mapping engine 130 without departing from the scope of this disclosure.

Profile ruleset 170 instructs mapping engine 130 in properly mapping profile constructs 144 with object-oriented constructs 153. As described in more detail in FIGS. 3A-D, ruleset 170 comprises instructions, algorithms, mapping tables, arrays, or any other directive or datum which largely allows for efficient and accurate integration between profile constructs 144 and object-oriented constructs 153. Although FIG. 1 illustrates profile ruleset 170 as residing internally to memory 120, profile ruleset 170 may reside externally at one or more computers or internally to mapping engine 130 without departing from the scope of this disclosure. Profile ruleset 170 illustrated in FIG. 1 is merely exemplary. System 100 contemplates any other suitable device to allow for suitable mapping of profile constructs 144 with object-oriented constructs 153. Moreover, profile ruleset 170 may be separated into multiple tables without departing from the scope of the disclosure.

Processor 125 executes instructions and manipulates data to perform the operations of computer 100, such as mapping engine 130. Although FIG. 1 illustrates a single processor 125 in computer 100, multiple processors 125 may be used and reference to processor 125 is meant to include multiple processors 125 where applicable. In the embodiment illustrated, computer 100 includes mapping engine 130 that integrates modeling constructs 143 and profile constructs 144 with object-oriented constructs 153. Mapping engine 130 could include any hardware, software, firmware, or combination thereof operable to integrate modeling templates 142 and object-oriented modules 152. It will be understood that while mapping engine 130 is illustrated as a single multi-tasked module, the features and functionality performed by this engine may be performed by multiple modules such as, for example, an interpreter module and a generation module. In one embodiment, mapping engine 130 parses modeling template 142 into modeling constructs 143 and profile constructs 144 and automatically generates object-oriented source code 152 based on modeling constructs 143 and profile constructs 144. In another embodiment, mapping engine 130 parses object-oriented modules 152 into object-oriented constructs 153 and automatically generates modeling template 142 based on object-oriented constructs 153. In this way, modeling template 142, including modeling constructs 143 and profile constructs 144, supports both a model represented by a generic modeling language and a modeling profile. Mapping engine 130 may use any appropriate technique to parse modeling templates 142 into modeling constructs 143 and profile constructs 144 such as, for example, document object modeling (DOM) or to parse object-oriented modules 152 into object-oriented constructs 153. The term "automatically," as used herein, generally means that the appropriate processing is substantially performed by system 100. It should be understood that automatically further contemplates any suitable user interaction with system 100.

In one aspect of operation, memory 120 receives a modeling template 142. As described above, modeling template 142 may be received from any appropriate component, internal or external, including, for example, from another computer via network 110. Upon receiving modeling template 142, mapping engine 130 loads modeling template 142, modeling ruleset 160, and profile ruleset 170. Mapping engine 130 then parses modeling template 142 into one or more modeling constructs 143 and one or more profile constructs 144. As described above, modeling constructs 143 may include modeling class constructs, modeling association constructs, or any other suitable modeling construct and profile constructs 144 may include stereotyped profile constructs and tagged profile constructs. Once modeling template 142 is parsed into various modeling constructs 143 and profile constructs 144, mapping engine 130 defines one or more object-oriented (or programming) constructs 153 based on the modeling constructs 143 using modeling ruleset 160 and profile constructs 144 using profile ruleset 170. Once mapping engine 130 has processed all of modeling constructs 143 and profile constructs 144 from parsed modeling template 142 and, subsequently, defined one or more object-oriented constructs 153, mapping engine 130 automatically generates one or more object-oriented source code modules 152. According to certain embodiments, mapping engine may define object-oriented constructs 153 by loading data structures, combining the definition and generation steps, or any other suitable processing.

In addition, while not explicitly described in FIG. 1, the operation and arrangement of elements within mapping engine 130 will depend upon the particular mapping techniques requested by computer 100. That is, mapping engine 130 may, alternatively or in combination, function to generate a modeling template 142, based on object-oriented source code 152 without departing from the scope of this disclosure. Object-oriented source code 152 is written in an object-oriented language with embedded inferencing and includes functionality that is not normally supported by modeling languages without use of a modeling profile. Accordingly, as described in more detail in FIGS. 5A-C, system 100 contemplates mapping engine 130 having any suitable combination and arrangement of hardware, software, algorithms, and/or controlling logic that operates to generate modeling template 142, including profile constructs 144, based on object-oriented source code 152.

Figure 2:
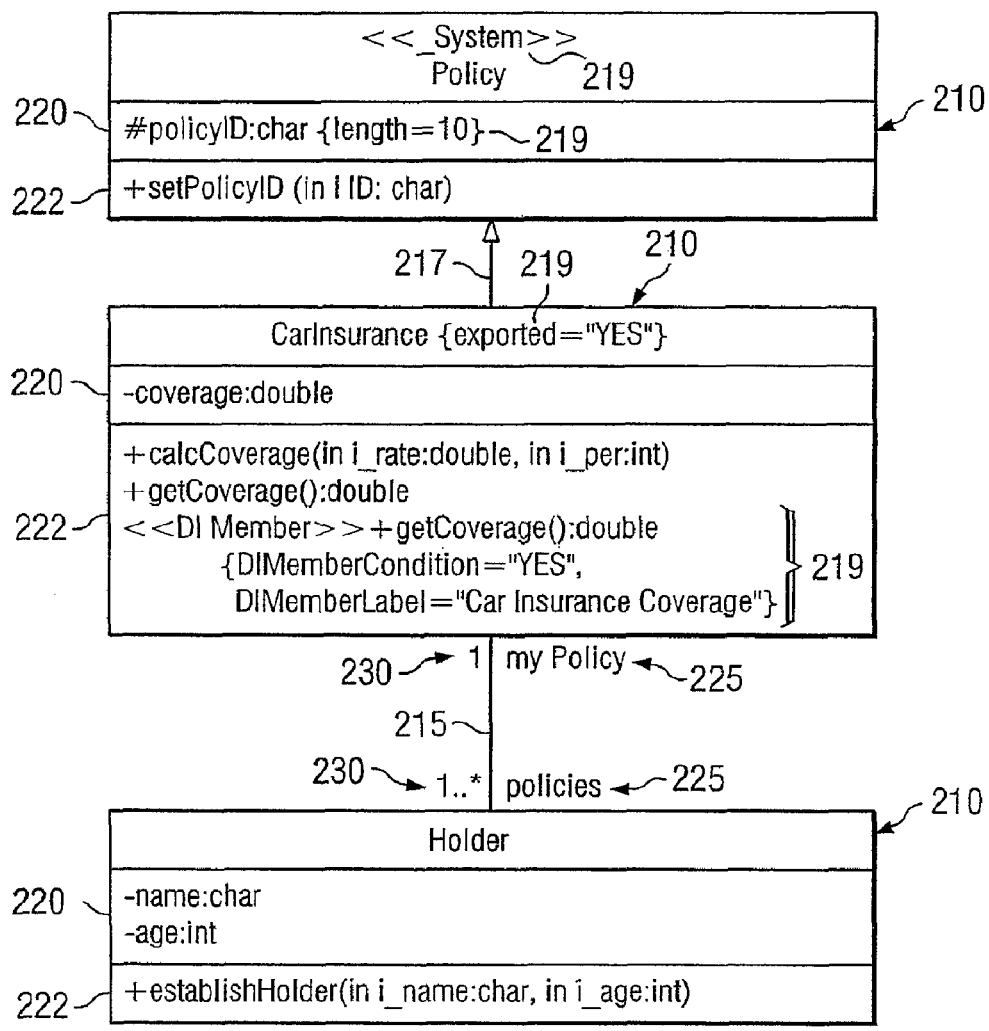
FIG. 2 is an exemplary diagram illustrating an example model including a modeling profile according to one embodiment of this disclosure.

FIG. 2 is an exemplary diagram illustrating an example object-oriented model 200 according to one embodiment of this disclosure. In general, model 200 can represent a logical object-oriented model of a software system or metamodel (not shown). Model 200 may include any number of architectural elements and may be described using any modeling language or format such as, for example, UML or any other suitable modeling language. Further, model 200 includes elements that are outside the standard functionality of the modeling language. Such elements are defined using a modeling profile such as, for example, a UML profile. In certain embodiments, model 200 and the modeling profile may conform to the OMG Unified Modeling Language Specification. Computer 100 contemplates receiving modeling template 142 that generically describes elements of model 200 such that mapping engine 130 may generate suitable source code in an object-oriented programming language with embedded inferencing.

According to certain embodiments, at the highest logical level example model 200 includes classes 210, association 215, generalization 217, and profile elements 219. Class 210 may include any set of elements that share substantially identical attributes 220, interfaces (not shown), or operations 222 as appropriate. Class 210 may include one or more instances. As described below, various classes 210 may also inherit attributes 220 and/or operations 222 from another class 210. Attribute 220 comprises a variable that may be stored in instances of class 210. Each attribute 220 may include a variable type and an initial value. Operation 222 represents any method or service that may be requested of class 210. Each operation 222 may include operation signatures that define parameters and directions. Example model 200 includes three classes 210: "Policy," "Carinsurance," and "Holder." First class 210 "Policy" includes attribute 220 "policy ID" and operation 222 "setPolicyID." Second class 210 "Carinsurance" includes attribute 220 "policy ID" and operations 222 "calcCoverage" and "getCoverage." Third class 210 "Holder" includes attributes 220 "name" and "age" and operation 222 "establishHolder."

Profile elements 219 include any modeling elements not normally supported by modeling languages. In certain embodiments, profile elements 219 include stereotypes, tag definitions, tagged values, constraints, and other suitable elements. Generally, a stereotype is a profile element 219 that allows supplemental values or constraints to be added to a standard model element such as classes 210, association 215, generalization 217, attributes 220, or operations 222. Tagged definitions assign new properties to standard model elements through tagged values. Constraints commonly are associated with a stereotype 219 but affect all standard model elements effected by the stereotype 219. Returning to the example, first class 210 "Policy" comprises stereotype element 219 "_System," which designates the "Policy" class as an abstract (non-instantiable) class 210, and tagged element 219 "length," which is the maximum length of an object-oriented attribute. Second class 210 "Carinsurance" includes stereotype element 219 "DI Member," which designates a (public) method that adds several metaattributes (or tagged values) that are significant to an object-oriented program with embedded inferencing, and three tagged elements 219: "exported," "DIMemberCondition," and "DIMemberLabel."

One or more classes 210 may be associated through association 215. Association 215 generally describes a semantic relationship that includes at two association ends, each association end normally comprising a class 210. It should be understood that the plurality of association ends may be one instance of class 210 in relation to another instance of the same class 210. Each association 215 includes two names 225 and at least one association metaattribute 230. Name 225 identifies the respective target instance to the source instance. Association metaattributes 230 may include navigability (allows traversal from source to target), multiplicity (number of allowable target instances), visibility (visibility of target instance to source), aggregation (target is an aggregation of source), ordering (target instances are viewed as ordered to source instance), changeability (source instance can change target instance), and any other suitable association metaattribute. For example, model 200 includes association 215 with two association ends: classes 210 "Carinsurance" and "Holder." In this example, when "Holder" is the source instance, then association name 225 of "Carinsurance" is "my Policy" with a multiplicity attribute 225 of one (1). When "Carinsurance" is the source, then "Holder" is the target with association name 225 "policies" and a multiplicity attribute 225 of one or more (1 . . . *).

Generalization 217 illustrates a taxonomic relationship between a parent class 210 and a child class 210. In certain embodiments, generalization 217 illustrates that child class 210 inherits attributes from parent class 210. Returning to example model 200, "Carinsurance" is a child of "Policy." In short, "Carinsurance" is a specialized form of "Policy" and, therefore, includes parent attribute 220 "policyID" and parent operation 222 "setPolicyID" as well as its own attribute 220 "coverage" and operations 222 "calcCoverage" and "getCoverage."

In one aspect of operation, computer 100 generates modeling template 142 based on model 200 using any appropriate technique and template language. One example technique includes generating one modeling class construct based on each class 210. Once modeling class constructs are generated, modeling attribute constructs and modeling operation constructs for the particular modeling class construct are generated based on attributes 220 and operations 222 from class 210, respectively. At any suitable point during this processing, profile constructs 144 are generated based, at least in part, on profile elements 219. For example stereotyped profile constructs 144 are generated using stereotyped profile elements 219 and tagged profile constructs 144 are generated using tagged profile elements 219. It will be further understood that any computer using any suitable software or logic may generate modeling template 142, in any appropriate template language, based on model 200 and the related modeling profile elements 219.

It should be understood that FIG. 2 illustrates merely one example of model 200. System 100 contemplates any model 200 including any number of elements in any order and layout. Further, model 200 may be written or developed in any modeling language without departing from the scope of this disclosure. It will be further understood that any computer using any suitable software or logic may generate modeling template 142, in any appropriate template language, based on model 200.

FIGS. 3A-D are exemplary diagrams illustrating an example profile ruleset 370 in accordance with one embodiment of computer system 100. Generally, profile ruleset 370 provides mapping engine 130 with rules, algorithms, or other directives for mapping profile constructs 144 with object-oriented constructs 153. Profile ruleset 370 may illustrate a software module, logic, a data structure, or any combination thereof. For illustrative purposes only, example profile ruleset 370 is a multi-dimensional data structure that includes at least one profile mapping instruction 375. Each profile mapping instruction 375 includes multiple columns or datums.

FIGS. 3A-B illustrate one embodiment of profile mapping ruleset 370. Example profile mapping ruleset 370 includes profile mapping instruction 375 for integrating stereotyped profile constructs 144 with object-oriented constructs 153. In this example embodiment, profile mapping instruction 375 is a table row including a stereotyped profile construct field 305, a parent modeling class field 310, associated tagged profile construct field 315, and a mapping algorithm 320. It will be understood that each profile mapping instruction 375 may include none, some, all of the example columns and may include other columns without departing from the scope of this disclosure. In one embodiment, profile mapping instruction 375 may include a link to another table such as, for example, parent modeling class field 310 may be used to access particular rules in modeling ruleset 160. It should be noted that profile mapping instruction 375 may be accessed by stereotyped profile construct field 305, parent modeling class field 310, associated tagged profile construct field 315, or any other field.

In certain embodiments, each stereotyped profile construct 305 represents one UML profile architectural element, defined as profiling construct 144, illustrated in more detail in FIG. 2. Parent modeling class field 310 represents the type of the respective parent modeling construct 143 of each stereotyped profile construct 144. Certain stereotyped profile constructs 305 also have an associated tagged profile construct 143 as illustrated in field 315. Mapping algorithms 320 illustrate the logic or algorithm used by mapping engine 130 to map stereotyped profile constructs 144 with object-oriented construct 153.

Example profile ruleset 370 includes mapping algorithms 320 for a number of stereotyped profile constructs 144. For example, profile mapping instructions 375 include algorithms 320 associated with "_Association," "_System," "Class Containment," "ConstrainedInteger," "ConstrainedReal," "ConstrainedString," "ConstrainedBoolean," "Domain Interface Member," "Inference Method," "Rule Method," and "bindvar" stereotyped profile constructs 305. Each algorithm 320 provides mapping engine 130 with the ability to map profile constructs 144 with object-oriented constructs 153. In one aspect of operation, if mapping engine 130 processes a "_System" profile construct 144, then mapping engine 130 may define an abstract object-oriented class construct 153*a* based on the stereotyped profile construct 144 according to algorithm 320. It will be understood that the illustrated algorithms 320 are for example purposes only and that mapping engine is operable to process any instruction suitable for mapping stereotyped profile constructs 144 with object-oriented constructs 153.

FIG. 3C-D illustrate another embodiment of profile mapping ruleset 370. Example profile mapping ruleset 370 includes profile mapping instruction 375 for integrating tagged profile constructs 144 with object-oriented constructs 153. In this example embodiment, profile mapping instruction 375 includes a tagged profile construct field 325, a modeling class field 330, semantics field 335, and a mapping algorithm 340. It will be understood that each profile mapping instruction 375 may include none, some, or all of the example columns. In one embodiment, profile mapping instruction 375 may include a link to another table, such as, for example, modeling class field 330 may be used to access particular rules in modeling ruleset 160. It should be noted that profile mapping instruction 375 may be accessed by tagged profile construct field 325, parent modeling class field 330, or any other field.

In certain embodiments, each tagged profile constructs 325 represents one UML profile architectural element illustrated in more detail in FIG. 2. Mapping algorithms 340 illustrate the logic or algorithm used by mapping engine 130 to map tagged profile constructs 144 with object-oriented construct 153. Example profile ruleset 370 includes mapping algorithms 340 for a number of tagged profile constructs 144 and/or object-oriented constructs 153. For example, profile mapping instructions 375 include "Exported," "EntryClass," "DataConstraint," "Length," "IsUnknown," "DI MemberCondition," "DIMemberAction," "DIMemberLabel," "Source," "Destination," and "Bind_Var" tagged profile constructs 305. It will be understood that the illustrated algorithms 340 are for example purposes only and that mapping engine is operable to process any instruction suitable for mapping tagged profile constructs 144 with object-oriented constructs 153.

The following flowcharts focus on the operation of example computer system 100 and mapping engine 130 described in FIG. 1, as this diagram illustrates functional elements that provide for the preceding integration techniques. However, as noted, system 100 contemplates using any suitable combination and arrangement of functional elements for providing these operations, and these techniques can be combined with other techniques as appropriate. Further, various changes may be made to the following flowcharts without departing from the scope of this disclosure. For example, any or all of the steps may be performed automatically by system 100.

Figure 4B:
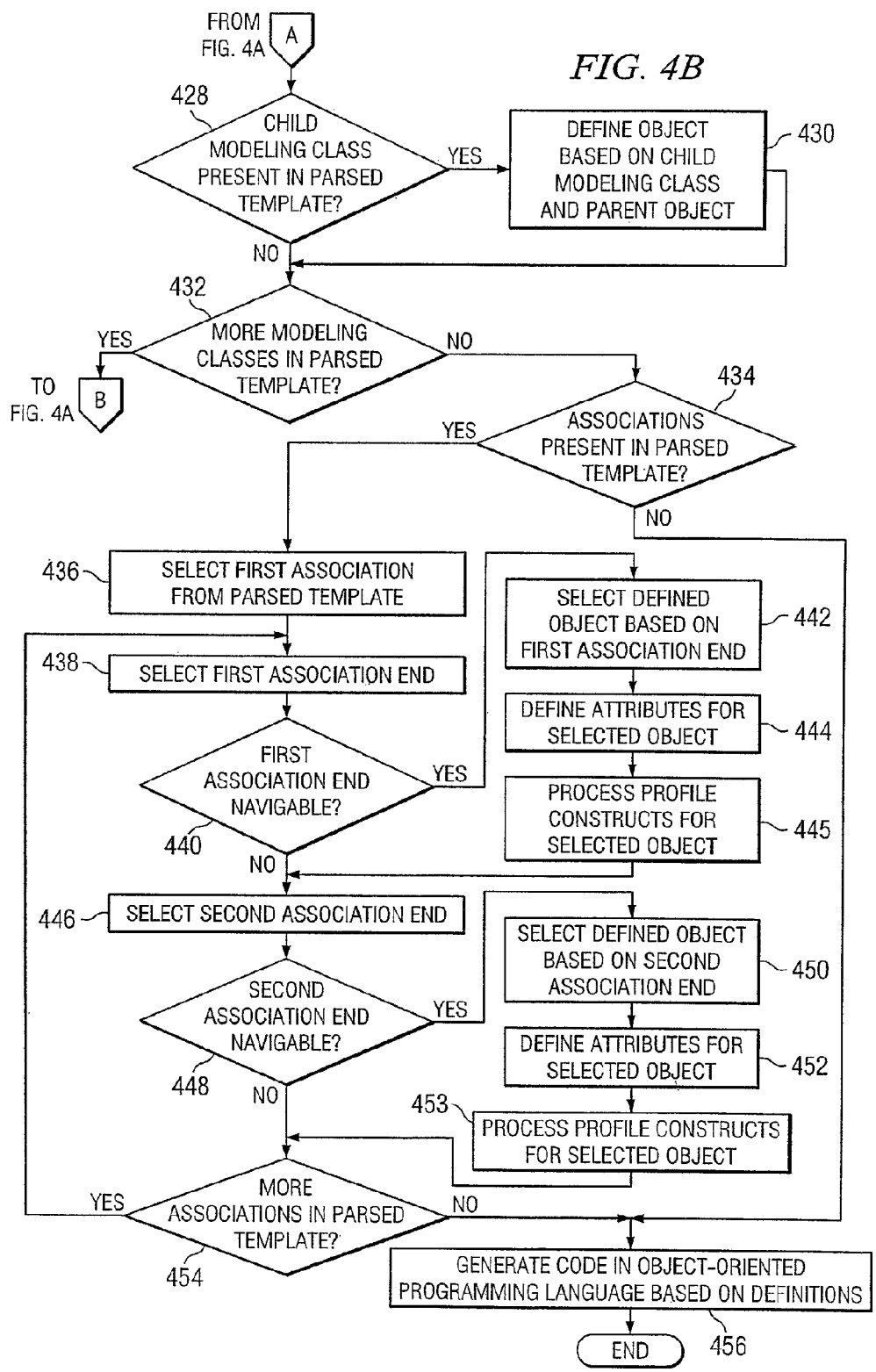

FIGS. 4A-B are exemplary flow diagrams illustrating an example method 400 for defining object-oriented constructs 153 based on a modeling template 142 according to one embodiment of this disclosure. Method 400 may be described with respect to system 100 of FIG. 1. Method 400 could also be used by any other suitable system.

Computer 100 receives modeling template 142 at step 402. According to one embodiment, mapping engine 130 receives modeling template 142 from modeling template table 140 in memory 120. As described above, computer 100 may receive modeling template from one or more computers via network 110. Mapping engine 130 parses modeling template 142 into one or more modeling constructs 143 and profile constructs 144 at step 404. This may include, for example, mapping engine 130 identifying modeling class constructs, modeling association constructs, modeling attribute constructs, modeling operation constructs, stereotyped elements, and tagged elements. At step 406 mapping engine 130 retrieves the first modeling class construct from the parsed modeling template 142. Next, in step 407 through step 432, mapping engine 130 processes the plurality of modeling constructs and defines one or more object-oriented constructs 153 on a class-by-class basis. Mapping engine 130 defines an object-oriented class construct based on the retrieved modeling class construct, including its metaattributes, at step 407. Further, mapping engine 130 may also determine if the retrieved modeling class construct has a parent class or interface and, accordingly, define attributes for the object-oriented class based on the parent. In step 408, mapping engine 130 processes any profile construct 144 that is associated with the modeling class construct. According to certain embodiments, mapping engine 130 may use profile construct 144 as a key into mapping ruleset 170 to obtain the desired algorithm for substantially defining or modifying the appropriate object-oriented class construct 153. Next, at decisional step 409, mapping engine 130 determines whether the class is an association class. If it is, then at step 410 mapping engine 130 adds the appropriate profile constructs 144 to the definition of the object-oriented class construct.

In steps 411 through 414, mapping engine 130 processes one or more attribute constructs for each modeling class construct. For example, at step 411 mapping engine 130 retrieves a first attribute for retrieved modeling class construct from the parsed modeling template 142. Mapping engine 130 defines an object-oriented attribute construct based on the retrieved modeling attribute construct at step 412. In step 413, mapping engine 130 processes any profile construct 144 that is associated with the modeling attribute construct. According to certain embodiments, mapping engine 130 may use profile construct 144 as a key into mapping ruleset 170 to obtain the desired algorithm for substantially defining or modifying the appropriate object-oriented attribute construct. Part of the definition of an object-oriented attribute construct may also include setting attribute properties such as, for example, type, visibility, initial value, or any other appropriate property for an object-oriented attribute. At decisional step 414, mapping engine 130 determines if there are more modeling attributes for the retrieved modeling class construct. If, at decisional step 414, mapping engine 130 determines that there are more modeling attributes, then mapping engine 130 retrieves the next attribute construct for the retrieved modeling class construct and processing returns to step 412. Once there are no remaining modeling attribute constructs for the retrieved modeling class construct, processing proceeds to step 416.

Once all the attributes for the retrieved modeling class construct have been processing, mapping engine 130 retrieves a first modeling operation construct for the retrieved modeling class construct at step 416. At step 418 mapping engine 130 defines an object-oriented method construct for the object-oriented class construct based on the retrieved modeling operation construct using any appropriate technique. Part of this method definition may also include mapping engine 130 setting method properties such as, for example, scope or access type. In step 421, mapping engine 130 processes any profile construct 144 that is associated with the modeling operation construct. According to certain embodiments, mapping engine 130 may use profile construct 144 as a key into profile ruleset 170 to obtain the desired algorithm for substantially defining or modifying the appropriate object-oriented method construct.

Mapping engine 130 then defines method arguments and return types based on the operation signature at step 420. At step 420, mapping engine 130 may also set default values and direction for the method. Mapping engine 130 may further define method implementation text "return NULL" if a return type is present. At decisional step 422, mapping engine 130 determines if there are more operations in the retrieved modeling class construct. If mapping engine 130 determines that there are more modeling operation constructs, then processing returns to step 418. Once all the objects in the retrieved modeling class construct have been processed, execution proceeds to step 424.

Mapping engine 130 determines if the object-oriented class construct is associated with a modeling interface at decisional step 424. If the object-oriented class construct is associated with an interface, then mapping engine 130 establishes the relationship of the object-oriented class construct to the modeling interface at step 426. Next, or if the object-oriented class construct is not associated with an interface, mapping engine 130 determines if there is a child modeling class construct present in parsed modeling template 142 at decisional step 428. If there are child modeling class constructs present, then mapping engine 130 defines object-oriented class constructs based on the child modeling class constructs and parent object-oriented class constructs. In certain embodiments, this definition of child object-oriented class construct uses techniques substantially similar to those defined in steps 408 through 432. At decisional step 432, mapping engine 130 determines if there are more modeling class constructs remaining in parsed modeling template 142. If there are more modeling class constructs, then mapping engine 130 retrieves the next modeling class construct 143 and processing returns to step 408. Otherwise, mapping engine 130 processes any modeling association constructs 143 present in parsed modeling template 142 in steps 434 through 454.

If no associations are present in modeling template 142, then processing proceeds to step 456. Otherwise, mapping engine 130 processes all the modeling association constructs in template 142. At step 436, mapping engine 130 selects a first association from modeling template 142. In step 437, mapping engine 130 processes any profile construct 144 that is associated with the modeling association construct. According to certain embodiments, mapping engine 130 may use profile construct 144 as a key into profile ruleset 170 to obtain the desired algorithm for substantially defining or modifying the appropriate object-oriented class construct. In steps 438 through 452, mapping engine 130 processes both ends of the selected association construct. At step 438, mapping engine 130 selects a first association end. At decisional step 440, mapping engine 130 determines if the first association end is navigable. If the first association end is not navigable, mapping engine 130 then proceeds to process the second association end beginning at step 446. If the first association end is navigable then mapping engine 130 selects a defined class construct based on the first association end at step 442. At step 444, mapping engine 130 then defines an attribute for the selected class construct based on various metaattributes of the association end. Mapping engine 130 then processes any profile constructs 144 for the selected object at step 445. At step 446, mapping engine 130 selects a second association end. At decisional step 448, mapping engine 130 determines if the second association end is navigable. If the second association end is not navigable, then execution proceeds to step 454. Otherwise, mapping engine 130 selects a defined class construct based on the second association end at step 450. Mapping engine 130 then defines an attribute for the selected class construct based upon metaattributes in the second association end at step 452. Mapping engine 130 then processes any profile constructs 144 for the selected object at step 453. At decisional step 454, mapping engine 130 determines if there are more associations in modeling template 142. If there are more associations, then mapping engine 130 selects the next association from modeling template 142 and processing returns to step 437. Once all of the associations in modeling template 142 have been processed, processing proceeds to step 456. At step 456, mapping engine 130 generates one or more object-oriented modules 152 in an object-oriented programming language with embedded inferencing based on the object-oriented constructs 153 defined using the above techniques. As described above in relation to FIG. 1, any suitable object-oriented language with embedded inferencing may be used.

Although FIGS. 4A-B illustrate one example of a method 400 for defining object-oriented constructs 153 based on a modeling template 142, various changes may be made to FIG. 3. For example, computer 100 may use any other type of modeling template 142 written in any suitable language. Also, while FIGS. 4A-B illustrate mapping engine 130 receiving modeling template 142 from memory 120, mapping engine 130 could receive modeling template 142 directly from network 110 via interface 115.

Figure 5B:
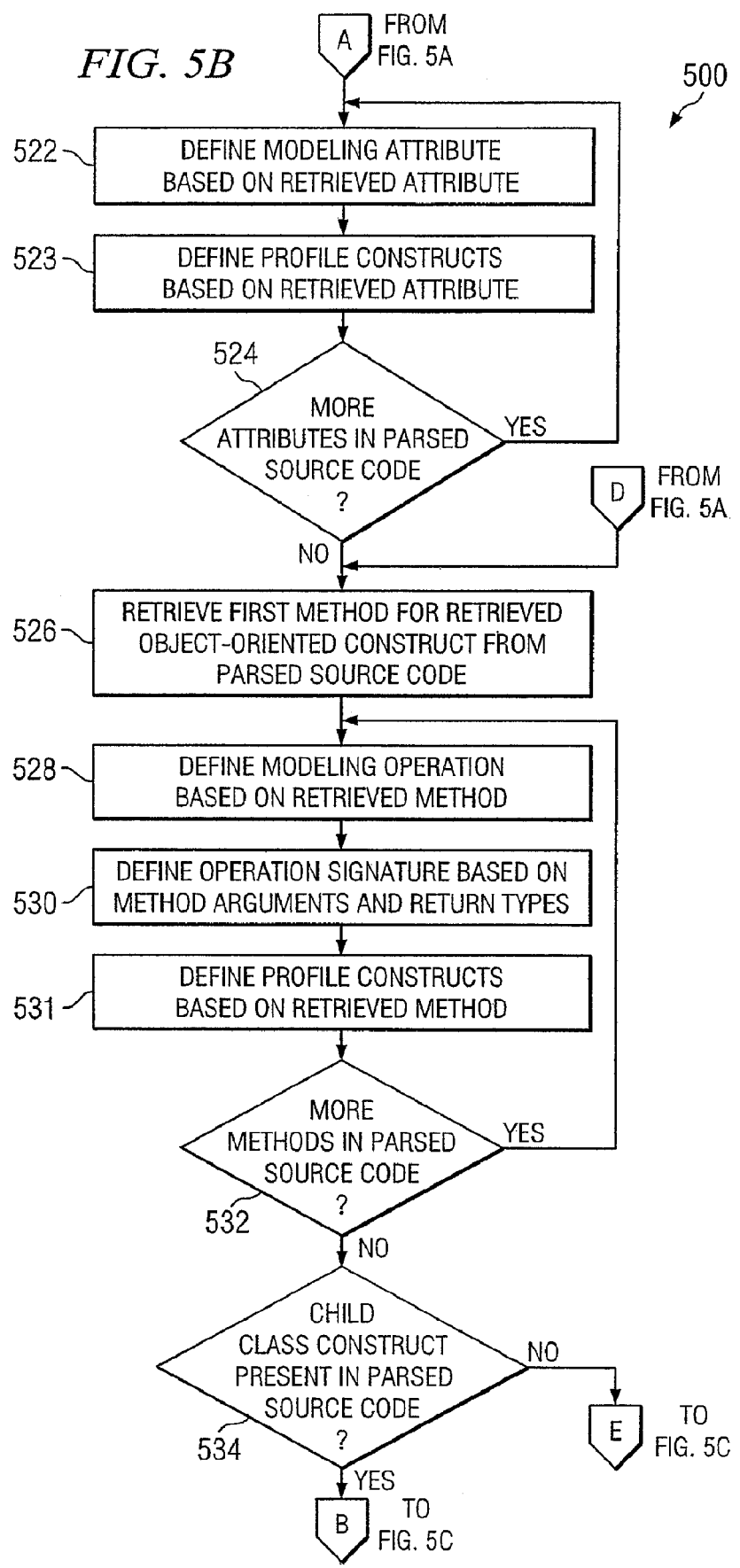
Figure 5C:
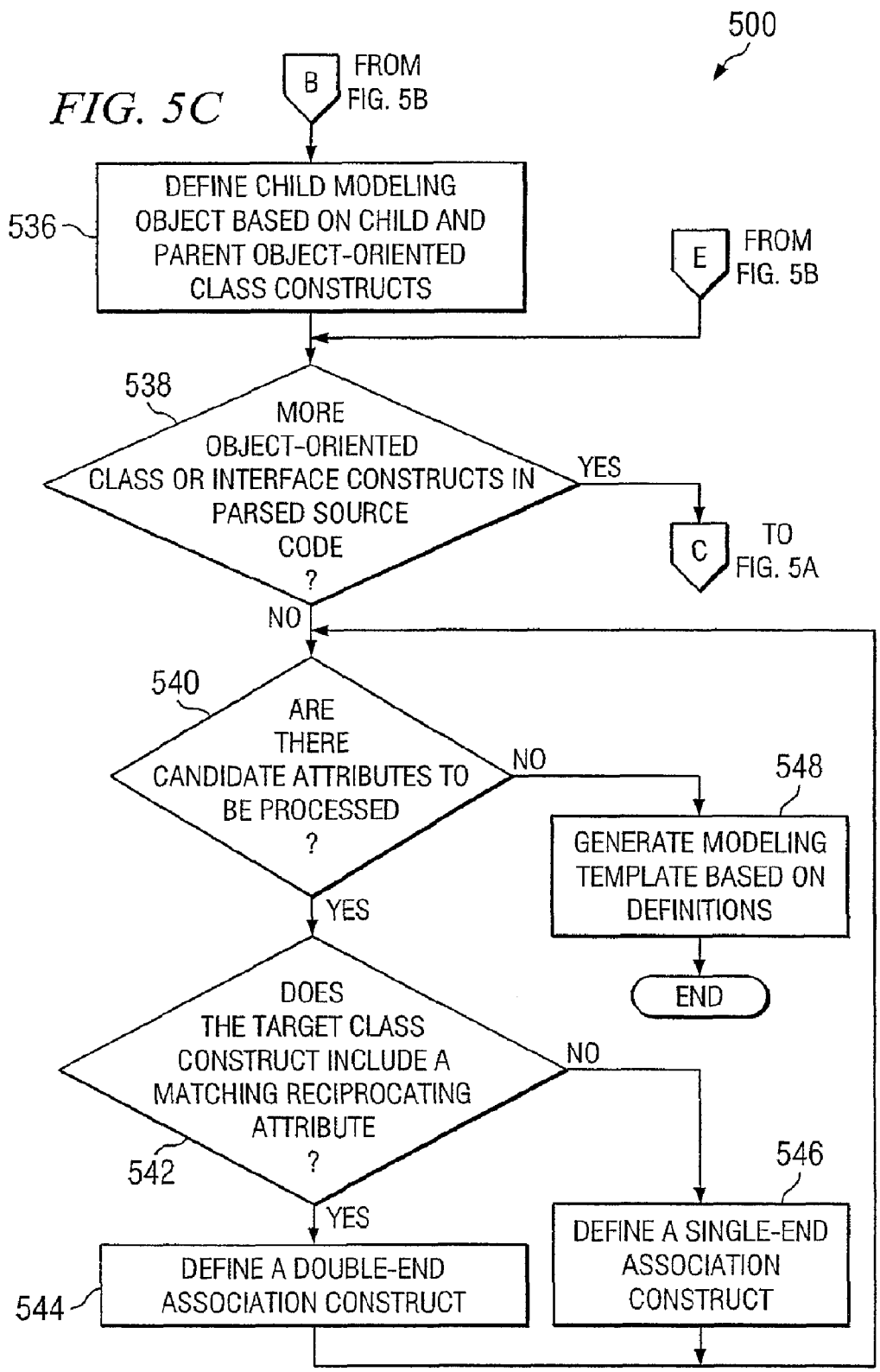

FIGS. 5A-C are exemplary flow diagrams illustrating an example method 500 for defining modeling constructs 143 and profile constructs 144 based on object-oriented source code 152 according to one embodiment of this disclosure. Method 500 may be described with respect to system 100 of FIG. 1. Method 500 could also be used by any other suitable system.

Computer 100 receives object-oriented source code at step 502. For example, memory 120 may receive one or more source code modules written in an object-oriented programming language with embedded inferencing from network 110 via interface 115. Mapping engine 130 may then load the various source code modules 152 and mapping ruleset 160. At step 504, mapping engine 130 parses the source code into one or more object-oriented constructs 153. At step 506, mapping engine 130 retrieves a first object-oriented class construct or interface construct from the parsed source code. Then, in step 508 to step 538, mapping engine 130 processes the one or more object-oriented class or interface constructs to define one or more modeling constructs 143 or profile constructs 144.

Once object-oriented class or interface construct 153 has been retrieved, mapping engine 130 determines if the retrieved construct is a class or an interface at step 508. If construct 153 is a class, then mapping engine 130 defines a modeling class construct and its metaattributes based on the object-oriented class construct and its properties at step 510. According to certain embodiments, mapping engine 130 may use object-oriented class construct as a key into mapping ruleset 160 to obtain the desired algorithm for substantially defining modeling class construct. Further, if mapping engine 130 locates any element that is beyond the capability of modeling construct 143, then in step 511, mapping engine 130 defines profile construct 144, which is used to substantially define or modify the appropriate modeling class construct. If object-oriented construct 153 is a class, mapping engine 130 may also determine if the retrieved object-oriented class construct has a parent class and, accordingly, define attributes for the modeling class based on the parent at step 514. At decisional step 515, mapping engine 130 determines if there are any interfaces associated with the object-oriented class construct. If there are, then mapping engine 130 defines a modeling realization dependency based on each interface at step 517. At decisional step 518, mapping engine 130 determines if the class is an association class. If it is, then mapping engine creates a modeling association class construct and any associated profile constructs 144 at step 519. Mapping engine 130 retrieves a first attribute for the retrieved object-oriented class construct at step 520. At step 522, mapping engine 130 defines a modeling attribute construct for modeling construct based on the object-oriented attribute construct retrieved for the object-oriented class construct. According to certain embodiments, mapping engine 130 may use object-oriented attribute construct as a key into mapping ruleset 160 to obtain the desired algorithm for substantially defining modeling attribute construct. Further, if mapping engine 130 locates any element that is beyond the capability of modeling construct 143, then in step 523, mapping engine 130 defines profile construct 144, which is used to substantially define or modify the appropriate modeling attribute construct. At decisional step 524, mapping engine 130 determines if there are more attributes for the retrieved object-oriented class construct. If there are more attributes, mapping engine 130 retrieves the next attribute for the object-oriented class construct and processing returns to step 522. Returning to decisional step 508, if mapping engine determined that the retrieved object-oriented construct was an interface, then mapping engine 130 defines a modeling interface based on the retrieved object-oriented interface construct at step 512. Once there are no more attributes for the object-oriented class construct at step 524 or the interface construct was defined at step 512, processing proceeds to step 526 through step 532 where mapping engine 130 processes various methods for the object-oriented class construct.

At step 526, mapping engine 130 retrieves a first object-oriented method construct for the object-oriented class or interface construct. Mapping engine 130 defines a modeling operation construct for modeling class or interface construct based on the retrieved class method construct at step 528. According to certain embodiments, mapping engine 130 may use object-oriented method construct as a key into mapping ruleset 160 to obtain the desired algorithm for substantially defining modeling operation construct 143. Next, mapping engine 130 defines one or more operation signatures based on the method arguments and return types at step 530. Further, if mapping engine 130 locates any element that is beyond the capability of modeling construct 143, then in step 531, mapping engine 130 defines profile construct 144, which is used to substantially define or modify the appropriate modeling operation construct. At decisional step 532, mapping engine 130 determines if there are more methods in the parsed source code from the object-oriented class or interface construct. If there are more methods, mapping engine 130 retrieves the next method for the object-oriented class or interface construct and processing returns to step 528. Once all the methods for the object-oriented constructs have been processed, processing proceeds to step 534.

At decisional step 534, mapping engine 130 determines if there are any child object-oriented class constructs present in the parsed source code. If there are no child class constructs then processing proceeds to step 538. If there are child object-oriented class constructs, then mapping engine 130 defines a child modeling class construct based on the child and parent object-oriented constructs 153 at step 536. At decisional step 538, mapping engine 130 determines if there are more object-oriented class or interface constructs in the source code parsed earlier at step 504. If there are more object-oriented class or interface constructs, then mapping engine 130 retrieves the next object-oriented construct and processing returns to step 508. Then, in steps 540 through 546, mapping engine 130 defines modeling associations based on the object-oriented source code.

At decisional step 540, mapping engine 130 determines if there are any candidate attributes to be processed. In certain embodiments, this may include processing a saved attribute file (not shown) that receives candidate attributes, which are attributes of a type equal to a reference to another class construct, during attribute processing; although any appropriate technique may be used. If there are any candidate attributes, then mapping engine 130 determines if the target class construct of each attribute includes a matching reciprocating attribute at decisional step 542. If the target class construct includes a matched attribute, then mapping engine 130 creates a double-end association construct at step 544. Otherwise, mapping engine 130 creates a single-end association construct, which includes a non-navigable end. At step 548, once all the object-oriented constructs have been processed, then mapping engine 130 generates at least one modeling template 142 based on the plurality of modeling constructs 143 and profile constructs 144 defined using the example techniques described above. Once generated, modeling template 142 may be used by computer 10 to create a new instance of model 200 using any appropriate technique or processing.

Although FIGS. 5A-C illustrate one example of a method 500 for defining modeling constructs 143 and profile constructs 144 based on object-oriented source code, various changes may be made to FIGS. 5A-C. For example, any object-oriented language with embedded inferencing may be used. Further, any type of source code written in the appropriate object-oriented language may be used such as, for example, modules, libraries, or any other suitable piece of source code. Also, while FIGS. 5A-C describe mapping engine 130 receiving an object-oriented module 152 from memory 120, mapping engine 130 could receive object-oriented module 152 directly from network 110 via interface 115.

While this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for automatically generating object-oriented source code in an object-oriented programming language with embedded inferencing, the object-oriented programming language with embedded inferencing having semantic features that support inferencing over rules without an instantiated inference engine, wherein the method comprises:
identifying a profile construct implemented in a modeling template, wherein the profile construct includes a semantic extension to a modeling language that provides the modeling language with functionality associated with the semantic features that support inferencing over rules in the object-oriented programming language with embedded inferencing;
mapping the profile construct implemented in the modeling template to an object-oriented construct in the object-oriented programming language with embedded inferencing, wherein a computer system uses a metamodel associated with the modeling language, a metamodel associated with the object-oriented programming language with embedded inferencing, and a mapping algorithm associated with the profile construct to map the profile construct to the object-oriented construct; and
generating an object-oriented source code module in the object-oriented programming language with embedded inferencing from the object-oriented construct mapped to the profile construct, wherein the object-oriented source code module includes the functionality associated with the semantic features that support inferencing over rules in the object-oriented programming language with embedded inferencing.

2. The method of claim 1, wherein the semantic extension that provides the modeling language with the functionality associated with the semantic features that support inferencing over rules includes an association that defines semantic relationships between architectural elements in the modeling language.

3. The method of claim 2, wherein the profile construct implemented in the modeling template defines the association, the object-oriented construct mapped to the profile construct defines the association, and the object-oriented source code module having the functionality associated with the semantic features that support inferencing over rules is generated from the object-oriented construct mapped to the profile construct defining the association.

4. The method of claim 1, wherein the semantic extension that provide the modeling language with the functionality associated with the semantic features that support inferencing over rules further includes a domain interface member that defines an action to execute in response to an architectural element in the modeling language satisfying a condition.

5. The method of claim 4, wherein the profile construct implemented in the modeling template defines the domain interface member, the object-oriented construct mapped to the profile construct defines the domain interface member, and the object-oriented source code module having the functionality associated with the semantic features that support inferencing over rules is generated from the object-oriented construct mapped to the profile construct defining the domain interface member.

6. The method of claim 1, further comprising executing the object-oriented source code module generated from the object-oriented construct on the computer system, wherein the object-oriented source code module executed on the computer system inherently supports inferencing over rules via the object-oriented source code module having the functionality associated with the semantic features that support inferencing over rules.

7. A system for automatically generating object-oriented source code in an object-oriented programming language with embedded inferencing, the object-oriented programming language with embedded inferencing having semantic features that support inferencing over rules without an instantiated inference engine, wherein the system comprises a computer system configured to:
identify a profile construct implemented in a modeling template, wherein the profile construct includes a mantic extension to a modeling language that provides the modeling language with functionality associated with the semantic features that support inferencing over rules in the object-oriented programming language with embedded inferencing;
map the profile construct implemented in the modeling template to an object-oriented construct in the object-oriented programming language with embedded inferencing, wherein the computer system uses a metamodel associated with the modeling language, a metamodel associated with the object-oriented programming language with embedded inferencing, and a mapping algorithm associated with the profile construct to map the profile construct to the object-oriented construct; and
generate an object-oriented source code module in the object-oriented programming language with embedded inferencing from the object-oriented construct mapped to the profile construct, wherein the object-oriented source code module includes the functionality associated with the semantic features that support inferencing over rules in the object-oriented programming language with embedded inferencing.

8. The system of claim 7, wherein the semantic extension that provides the modeling language with the functionality associated with the semantic features that support inferencing over rules includes an association that defines semantic relationships between architectural elements in the modeling language.

9. The system of claim 8, wherein the profile construct implemented in the modeling template defines the association, the object-oriented construct mapped to the profile construct defines the association, and the object-oriented source code module having the functionality associated with the semantic features that support inferencing over rules is generated from the object-oriented construct mapped to the profile construct defining the association.

10. The system of claim 7, wherein the semantic extension that provides the modeling language with the functionality associated with the semantic features that support inferencing over rules further includes a domain interface member that defines an action to execute in response to an architectural element in the modeling language satisfying a condition.

11. The system of claim 10, wherein the profile construct implemented in the modeling template defines the domain interface member, the object-oriented construct mapped to the profile construct defines the domain interface member, and the object-oriented source code module having the functionality associated with the semantic features that support inferencing over rules is generated from the object-oriented construct mapped to the profile construct defining the domain interface member.

12. The system of claim 7, wherein the computer system is further configured to execute the object-oriented source code module generated from the object-oriented construct, wherein the object-oriented source code module executed on the computer system inherently supports inferencing over rules via the object-oriented source code module having the functionality associated with the semantic features that support inferencing over rules.

13. A non-transitory computer readable medium that stores a modeling profile defining a semantic extension to a modeling language, wherein the modeling profile stored on the computer readable medium comprises:
- a plurality of tagged profile constructs that assign new properties to standard model elements associated with the modeling language, wherein the new properties that the plurality of tagged profile constructs assign to the standard model elements associated with the modeling language define a semantic extension to the modeling language;
- a plurality of stereotyped profile constructs that add supplemental values or constraints to the standard model elements associated with the modeling language, wherein the supplemental values or constraints that the plurality of stereotyped profile constructs add to the standard model elements associated with the modeling language further define the semantic extension to the modeling language; and
- a plurality of mapping algorithms that map the plurality of tagged profile constructs and the plurality of stereotyped profile constructs to an object-oriented constructs construct in an object-oriented programming language having semantic features that support inferencing over rules without an instantiated inference engine, wherein the semantic extension defined in the modeling profile provides the modeling language with the semantic features that support inferencing over rules in the object-oriented programming language.

14. The computer readable medium of claim 13, wherein the plurality of stereotyped profile constructs includes an association profile construct that defines a semantic relationship between the standard model elements associated with the modeling language.

15. The computer readable medium of claim 14, wherein the plurality of tagged profile constructs includes a source profile construct and a destination profile construct associated with the semantic relationship defined in the association profile construct.

16. The computer readable medium of claim 15, wherein the association profile construct, the source profile construct, and the destination profile construct define the semantic extension that provides the modeling language with the semantic features that support inferencing over rules.

17. The computer readable medium of claim 13, wherein the plurality of stereotyped profile constructs include a domain interface member profile construct that defines an action to execute in response to the standard model elements associated with the modeling language satisfying a condition, and wherein the plurality of tagged profile constructs include an action profile construct that defines the action and a condition profile construct that defines the condition.

18. The computer readable medium of claim 17, wherein the domain interface member profile construct, the action profile construct, and the destination profile construct define the semantic extension that provides the modeling language with the semantic features that support inferencing over rules.

19. The computer readable medium of claim 13, wherein the plurality of stereotyped profile constructs include a rule profile construct that defines an action to execute in response to the standard model elements associated with the modeling language satisfying a condition.

20. The computer readable medium of claim 19, wherein the rule profile construct defines a semantic extension that provides the modeling language with the semantic features that support inferencing over rules.

* * * * *